US012744058B1

(12) United States Patent
Hu et al.

(10) Patent No.: US 12,744,058 B1
(45) Date of Patent: Sep. 22, 2026

(54) TECHNIQUES FOR MITIGATION OF CARBONACEOUS SMEAR IN HEAT-ASSISTED MAGNETIC RECORDING

(71) Applicant: Western Digital Technologies, Inc., San Jose, CA (US)

(72) Inventors: Yong Hu, San Ramon, CA (US); Hung V. Nguyen, San Jose, CA (US); Biao Sun, Fremont, CA (US); Taichi Nakamura, Sagamihara (JP); Xiaojuan Ran, Shenzhen (CN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 19/194,127

(22) Filed: Apr. 30, 2025

(30) Foreign Application Priority Data

Mar. 24, 2025 (CN) ........................ 202510353686.0

(51) Int. Cl.
*G11B 5/60* (2006.01)
*G11B 5/00* (2006.01)

(52) U.S. Cl.
CPC .... *G11B 5/6082* (2013.01); *G11B 2005/0021* (2013.01)

(58) Field of Classification Search
None
See application file for complete search history.

(56) References Cited

U.S. PATENT DOCUMENTS 5,831,792 A 11/1998 Ananth
5,940,249 A * 8/1999 Hendriks ................ G11B 5/58
6,594,113 B2 7/2003 Rao et al.
6,920,015 B2 7/2005 Mundt et al.
7,936,538 B1 5/2011 Zhang et al.
8,477,458 B2 7/2013 Lee et al.
8,681,455 B2 3/2014 Reddy et al.
8,810,968 B2 8/2014 Rajasekharan et al.
8,988,830 B1 * 3/2015 Peng .................... G11B 5/6082 360/236.1

(Continued)

OTHER PUBLICATIONS

Qilong Cheng and David B. Bogy, "Experimental study of smear formation and removal in heat-assisted magnetic recording," Tribology International 165 (2022), 107258.2.

(Continued)

*Primary Examiner* — Peter Vincent Agustin

(57) ABSTRACT

Disclosed are sliders, data storage devices comprising them, and methods of making them. A slider may include a trailing-edge surface, a trailing pad, and a trailing horizontal surface. The trailing pad may comprise an air-bearing surface (ABS) and a trailing pad rear surface, wherein the trailing pad rear surface is substantially perpendicular to the ABS and substantially parallel to the trailing-edge surface, and wherein the trailing pad rear surface is recessed from the trailing-edge surface by a down-track distance. The trailing horizontal surface may be situated between a base of the trailing pad rear surface and the trailing-edge surface. A width of the trailing horizontal surface in a down-track direction may be the down-track distance, which is greater than zero and less than or equal to about 12 microns. In some embodiments, the trailing horizontal surface is eliminated, and the trailing pad rear surface is coincident with the trailing-edge surface.

22 Claims, 12 Drawing Sheets

(56) References Cited

U.S. PATENT DOCUMENTS

| | | | | |
|---|---|---|---|---|
| 9,001,468 | B2 | 4/2015 | Krolnik, II et al. | |
| 9,190,090 | B1 | 11/2015 | Zhang et al. | |
| 9,431,035 | B2 | 8/2016 | Jones et al. | |
| 9,431,044 | B1 * | 8/2016 | Sun | G11B 5/1871 |
| 9,601,140 | B1 | 3/2017 | Rajauria | |
| 9,691,422 | B1 * | 6/2017 | Hu | G11B 5/6005 |
| 9,761,260 | B1 | 9/2017 | Ferrero et al. | |
| 9,875,764 | B1 | 1/2018 | Riddering | |
| 9,940,953 | B1 * | 4/2018 | Zavaliche | G11B 5/40 |
| 10,037,774 | B1 | 7/2018 | Ferrero et al. | |
| 10,058,890 | B1 | 8/2018 | Buettner et al. | |
| 10,586,563 | B1 * | 3/2020 | Zhang | G11B 5/4826 |
| 10,629,236 | B1 | 4/2020 | Liu et al. | |
| 10,679,656 | B1 | 6/2020 | Lu et al. | |
| 10,737,291 | B2 | 8/2020 | Buettner et al. | |
| 10,796,721 | B1 | 10/2020 | Rakshit et al. | |
| 11,355,143 | B2 | 6/2022 | Lu et al. | |
| 11,594,247 | B1 * | 2/2023 | Sun | G11B 5/4826 |
| 2008/0002298 | A1 * | 1/2008 | Sluzewski | G11B 5/314 360/234.4 |
| 2014/0036384 | A1 * | 2/2014 | Zheng | G11B 5/6082 360/59 |
| 2017/0221511 | A1 | 8/2017 | Dai et al. | |
| 2017/0287514 | A1 * | 10/2017 | Rausch | G11B 5/607 |
| 2020/0152233 | A1 * | 5/2020 | Liu | G11B 5/6064 |

OTHER PUBLICATIONS

Roshan Mathew Tom et al., “Optical forces in heat-assisted magnetic recording head-disk interface,” Scientific Reports, 2023, 13:8451, https://doi.org/10.1038/s41598-023-35126-3.

Shaomin Xiong et al., “Smear removal/mitigation by approaching head disk proximity,” The IP.com Journal, Jul. 1, 2016, available at https://priorart.ip.com/IPCOM/000246812/Smear-removal-mitigation-by-approaching-head-disk- proximity.

* cited by examiner

TECHNIQUES FOR MITIGATION OF CARBONACEOUS SMEAR IN HEAT-ASSISTED MAGNETIC RECORDING

CROSS-REFERENCE TO RELATED APPLICATIONS

This application claims priority from, and hereby incorporates by reference in its entirety for all purposes, China patent application No. 202510353686.0, which was filed on Mar. 24, 2025 and is entitled “TECHNIQUES FOR MITIGATION OF CARBONACEOUS SMEAR IN HEAT-ASSISTED MAGNETIC RECORDING”.

BACKGROUND

Data storage devices, such as hard disk drives, are used to store large amounts of information. In magnetic storage systems, a magnetic head typically includes read and write transducers that allow magnetically encoded information on a magnetic recording medium, such as a disk, to be stored and retrieved.

The need to increase storage densities has led to the development of data storage technologies such as microwave-assisted magnetic recording (MAMR) and heat-assisted magnetic recording (HAMR). In MAMR, elements added to the recording head generate an additional field that supplements the magnetic field ordinarily produced by the write transducer, thereby providing a stronger effective write field. In HAMR, elements added to the recording head heat a localized area on the surface of the recording media to reduce its coercivity, thereby enabling the magnetic field generated by the write transducer, which otherwise would be of insufficient strength, to set the magnetization of the localized area. Both of these techniques can result in the recording head operating at higher temperatures than recording heads in conventional hard drives, which can shorten the lifetime of the data storage device.

A potential issue with HAMR devices is that excessive heating of the near-field transducer (NFT) used in the heating process can cause performance degradation and eventually failure of the data storage device. One contributing factor to excessive heating may be adsorption of carbonaceous material on the slider overcoat near the NFT tip. Relative to data storage devices that use older recording technologies such as perpendicular magnetic recording, HAMR devices tend to have a thicker carbon overcoat (e.g., $CN_x$) on the recording medium. Hydrocarbon molecules from the recording medium overcoat and lubricant can become mobile at elevated temperatures and adsorb on the air-bearing surface (ABS) of the slider. Over time, these molecules can form a “smear” on the ABS that absorbs power from the laser source and causes the NFT, which normally operates at very high temperatures, to become even hotter than usual. The heat transfer can result in diffusion of the NFT metal until the NFT tip rounds and its performance degrades, eventually possibly leading to failure of the data storage device.

In addition to potentially affecting the NFT reliability, smear can affect the fly height of the slider in a manner that varies over time. The carbonaceous material can build up as the data storage device operates and then become detached (e.g., when thick enough that it touches the recording medium and drops off, or when its weight causes it to drop off). Accordingly, the changing characteristics of smear (e.g., its presence, thickness, etc.) can cause variations in the slider fly height. These variations can adversely affect the performance of the data storage device, such as its writing performance.

Accordingly, there is a need for techniques that can provide improvements.

SUMMARY

This summary represents non-limiting embodiments of the disclosure.

In some aspects, the techniques described herein relate to a slider, including: a trailing-edge surface; a trailing pad including an air-bearing surface (ABS) and a trailing pad rear surface, wherein the trailing pad rear surface is substantially perpendicular to the ABS and substantially parallel to the trailing-edge surface, and wherein the trailing pad rear surface is recessed from the trailing-edge surface by a down-track distance; and a trailing horizontal surface situated between a base of the trailing pad rear surface and the trailing-edge surface, wherein a width of the trailing horizontal surface in a down-track direction is the down-track distance, wherein: the down-track distance is greater than zero and less than or equal to about 12 microns.

In some aspects, the slider further includes a recording head situated on the ABS of the trailing pad. In some aspects, the recording head includes a heat-assisted magnetic recording (HAMR) transducer.

In some aspects, the down-track distance is selected to mitigate accumulation of smear on at least one of the trailing pad rear surface or on the trailing horizontal surface.

In some aspects, a vertical distance between the ABS of the trailing pad and the trailing horizontal surface is greater than zero and less than or equal to about 500 nanometers.

In some aspects, a vertical distance between the ABS of the trailing pad and the trailing horizontal surface is greater than zero and less than or equal to about 500 nanometers, and/or at least one of the down-track distance or the vertical distance is selected to mitigate accumulation of smear on at least one of the trailing pad rear surface or on the trailing horizontal surface, and/or a smear accumulation path length is less than about 12 microns.

In some aspects, at least one of the down-track distance or the vertical distance is selected to mitigate accumulation of smear on at least one of the trailing pad rear surface or on the trailing horizontal surface.

In some aspects, the down-track distance is less than or equal to 1% of an overall length of the slider in the down-track direction.

In some aspects, the trailing pad further includes an efficiency-flattening hole.

In some aspects, the techniques described herein relate to a method of designing a slider, the method including: selecting the down-track distance based at least in part on at least one of: (a) a likelihood of smear accumulation, or (b) a smear accumulation path length.

In some aspects, the techniques described herein relate to a method of making a slider having a trailing horizontal surface with a down-track distance greater than zero and less than or equal to about 12 microns, the method including: applying a mask to the slider, wherein the mask exposes a first region corresponding to the trailing horizontal surface; and, while the mask is in place, performing an etching step to create the trailing horizontal surface.

In some aspects, the techniques described herein relate to a data storage device, including: a recording medium; and a slider, including: a trailing-edge surface; a trailing pad including an air-bearing surface (ABS) and a trailing pad rear surface, wherein the trailing pad rear surface is substantially perpendicular to the ABS and substantially parallel to the trailing-edge surface, and wherein the trailing pad rear surface is recessed from the trailing-edge surface by a down-track distance; and a trailing horizontal surface situated between a base of the trailing pad rear surface and the trailing-edge surface, wherein a width of the trailing horizontal surface in a down-track direction is the down-track distance, wherein: the down-track distance is greater than zero and less than or equal to about 12 microns.

In some aspects, the techniques described herein relate to a slider, including: a trailing-edge surface; and a trailing pad including: a heat-assisted magnetic recording (HAMR) head situated on an air-bearing surface (ABS) of the trailing pad, wherein the ABS of the trailing pad is substantially perpendicular to the trailing-edge surface, and a trailing pad rear surface, wherein the trailing pad rear surface is coincident with the trailing-edge surface.

In some aspects, the trailing pad further includes an efficiency-flattening hole. In some aspects, a depth of the efficiency-flattening hole relative to the ABS of the trailing pad is between approximately 400 nm and 4000 nm.

In some aspects, the techniques described herein relate to a method of making a slider, the method including: creating the trailing pad rear surface and the trailing-edge surface in a single process step. In some aspects, the single process step includes lapping.

In some aspects, the techniques described herein relate to a data storage device, including: a recording medium; and a slider including: a trailing-edge surface; and a trailing pad including: means for using heat to write bits to the recording medium, and a trailing pad rear surface, wherein the trailing pad rear surface is coincident with the trailing-edge surface.

In some aspects, the trailing pad of the data storage device further includes means for directing gas toward the means for using heat to write bits to the recording medium.

In some aspects, the trailing pad of the data storage device further includes means for reading the bits from the recording medium.

BRIEF DESCRIPTION OF THE DRAWINGS

Objects, features, and advantages of the disclosure will be readily apparent from the following description of certain embodiments taken in conjunction with the accompanying drawings in which.

Figure 1:
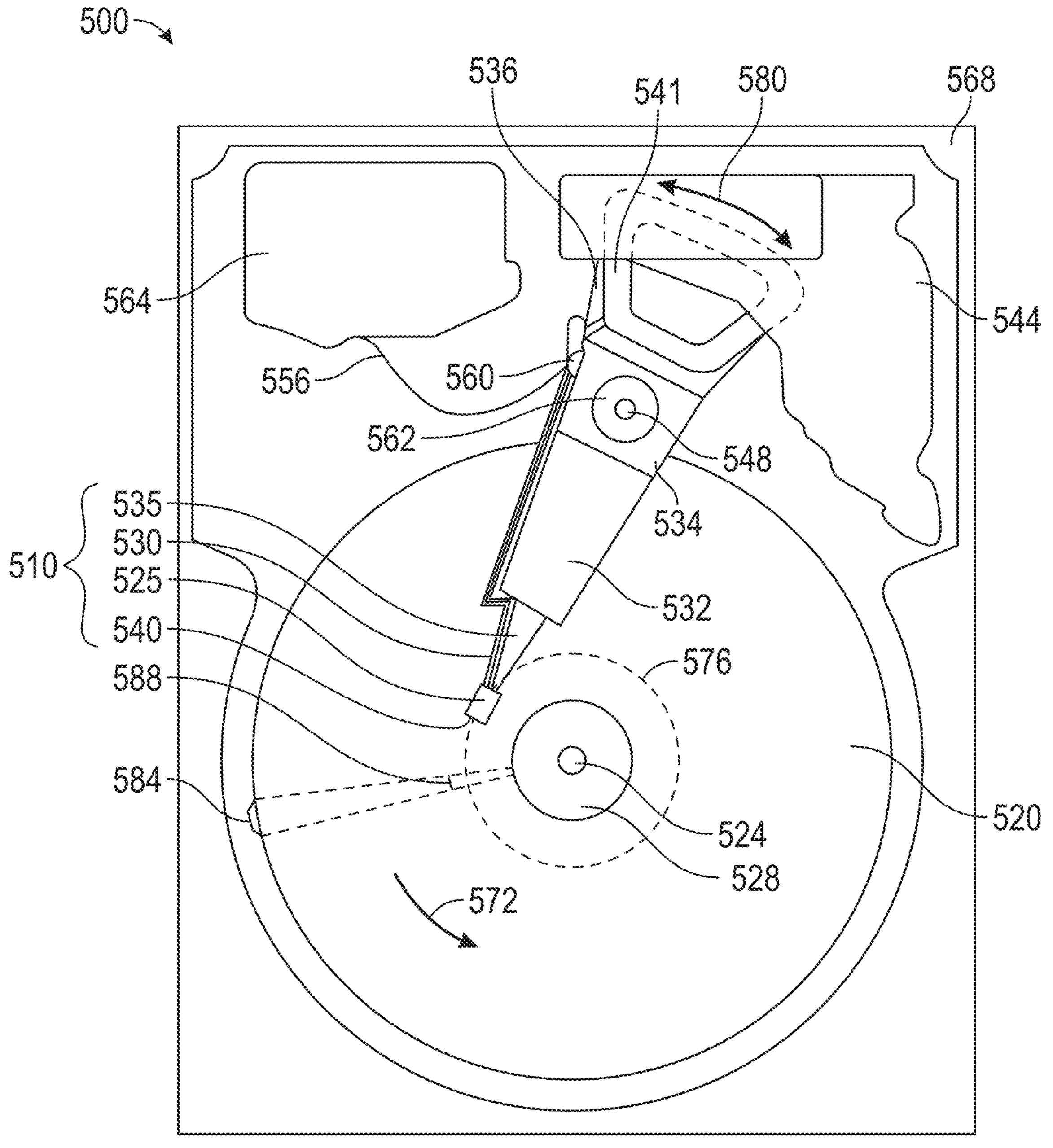
FIG. 1 is a plan view illustrating an example of a data storage device, illustrated as a hard disk drive, that may include one or more of the embodiments disclosed herein.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

FIG. 1 is a plan view illustrating an example of a data storage device 500, illustrated as a hard disk drive, that may include one or more of the embodiments disclosed herein. FIG. 1 illustrates an example of the functional arrangement of components of the data storage device 500, including a slider 525 that includes a recording head 540. The recording head 540 (which may also be referred to herein as a transducer or a read/write transducer) includes a write element and a read element for respectively writing and reading bits stored on a recording medium 520 of the data storage device 500. The data storage device 500 includes at least one head gimbal assembly (HGA) 510, which includes the slider 525, a suspension and actuator arm 530 attached to the slider 525, and a load beam 535 attached to the suspension and actuator arm 530.

The data storage device 500 also includes at least one recording medium 520, which may be, for example, a magnetic recording medium, rotatably mounted on a spindle 524, and a drive motor (not shown) attached to the spindle 524 for rotating the recording medium 520. The recording medium 520, which may include a plurality of disks, may be affixed to the spindle 524 with a disk clamp 528. The recording medium 520 may include a protective overcoat, such as carbon nitride ($CN_x$). The recording medium 520, which may include a plurality of disks, may be affixed to the spindle 524 with a disk clamp 528.

The data storage device 500 further includes an arm 532 attached to the HGA 510, a carriage 534, a voice-coil motor (VCM) that includes an armature 536 including a voice coil 541 attached to the carriage 534, and a stator 544 including a voice-coil magnet. The armature 536 of the VCM is attached to the carriage 534 and is configured to move the arm 532 and the HGA 510 to access portions of the recording medium 520. The carriage 534 is mounted on a pivot-shaft 548 with an interposed pivot-bearing assembly 562. In the case of an HDD having multiple disks (also sometimes referred to as "platters"), the carriage 534 may be called an "E-block," or comb, because the carriage 534 is arranged to carry a ganged array of arms (multiple instances of the arm 532) that gives it the appearance of a comb.

An assembly comprising a head gimbal assembly (e.g., HGA 510), including a suspension flexure to which the slider 525 is coupled, an actuator arm (e.g., the arm 532) to which the suspension is coupled, and an actuator (e.g., the VCM) to which the actuator arm is coupled, may be collectively referred to as a head stack assembly (HSA). The HSA also includes a suspension tail. Generally, the HSA is the assembly configured to move the slider 525 to enable the recording head 540 to access portions of the recording medium 520 (e.g., magnetic-recording disks) for read and write operations.

In accordance with some embodiments, electrical signals (for example, current to the voice coil 541 of the VCM, write signals to and read signals from the recording head 540, etc.) are provided by a flexible interconnect cable 556 (which may be referred to as a "flex cable"). Interconnection between the flex cable 556 and the recording head 540 may be provided by an arm-electronics module 560, which may have an on-board pre-amplifier for the read signal, as well as other read-channel and write-channel electronic components. The arm-electronics module 560 may be attached to the carriage 534 as shown. The flex cable 556 is coupled to an electrical-connector block 564, which provides electrical communication through electrical feed-throughs provided by a data storage device housing 568. The data storage device housing 568, in conjunction with a cover (not shown), provides a sealed, protective enclosure for the information storage components of the data storage device 500.

In accordance with some embodiments, other electronic components, including a disk controller and servo electronics such as a digital-signal processor (DSP), provide electrical signals to the drive motor, the voice coil 541 of the VCM, and the recording head 540 of the HGA 510. The electrical signal provided to the drive motor enables the drive motor to spin, thereby providing a torque to the spindle 524, which is in turn transmitted to the recording medium 520 that is affixed to the spindle 524 by the disk clamp 528; as a result, the recording medium 520 spins in a direction 572. Because it is spinning, the recording medium 520 creates a cushion of gas (e.g., air) that acts as an air-bearing on which the air-bearing surface (ABS) of the slider 525 rides so that the slider 525 flies above the surface of the recording medium 520 without making contact with a thin magnetic-recording layer of the recording medium 520 in which information is recorded.

The electrical signal provided to the voice coil 541 of the VCM enables the recording head 540 of the HGA 510 to access a track 576 on which information is recorded. Thus, the armature 536 of the VCM swings through an arc 580, which enables the HGA 510 attached to the armature 536 by the arm 532 to access various tracks on the recording medium 520. Information is stored on the recording medium 520 in a plurality of sectored tracks arranged in sectors on the recording medium 520, for example, sector 584. Correspondingly, each track is composed of a plurality of sectored track portions, for example, the sectored track portion 588. Each sectored track portion 588 includes recorded data and a header containing a servo-burst-signal pattern, for example, an ABCD-servo-burst-signal pattern, information that identifies the track 576, and error correction code information. In accessing the track 576, the read element of the recording head 540 of the HGA 510 reads the servo-burst-signal pattern, which provides a position-error-signal (PES) to the servo electronics, which controls the electrical signal provided to the voice coil 541 of the VCM, enabling the recording head 540 to follow the track 576. Upon finding the track 576 and identifying a particular sectored track portion 588, the recording head 540 either reads data (e.g., bits) from the track 576 or writes data (e.g., bits) to the track 576, depending on instructions received by the disk controller from an external agent, for example, a microprocessor of a computer system to which the data storage device 500 is connected.

For reading the information stored on the recording medium 520, the recording head 540 may include only one read sensor, or it may include multiple read sensors. The read sensor(s) in the recording head 540 may include, for example, one or more giant magnetoresistance (GMR) sensors, tunneling magnetoresistance (TMR) sensors, or another type of magnetoresistive sensor. When the slider 525 passes over a track 576 on the recording medium 520, the recording head 540 detects changes in resistance due to magnetic field variations recorded on the recording medium 520, which represent the recorded bits.

The data storage device 500 may be what is at times referred to as a "hybrid drive." A hybrid drive refers generally to a storage device having functionality of both a traditional hard disk drive (HDD) combined with a solid-state storage device (SSD) using non-volatile memory, such as flash or other solid-state (e.g., integrated circuits) memory, which is electrically erasable and programmable. Because operation, management, and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Furthermore, a hybrid drive may be architected and configured essentially as two storage devices in a single enclosure, e.g., a traditional HDD and a SSD, with either one or multiple interfaces for host connection.

Many older data storage devices 500 operate in a standard air (e.g., nitrogen, oxygen, and water vapor mixture) atmosphere. Recording media 520 in data storage device 500 spin at high revolutions per minute, which, against the friction of an air atmosphere, is relatively inefficient and requires a certain amount of power. To address this inefficiency, a data storage device 500 can be filled at least partially with a lower-density gas, such as helium or hydrogen, and sealed to control and maintain the internal environment of the data storage device 500. Sealing mitigates or prevents leakage of internal gases from within the data storage device 500. The use of helium, which has a density that is approximately one-seventh that of air, reduces friction and vibration in the data storage device 500, thereby creating less drag and turbulence. Consequently, by running the data storage device 500 in a less-dense atmosphere, such as an atmosphere of helium or a mixture of helium and oxygen, friction on the recording medium 520 is reduced, thereby causing the recording medium 520 to require less power in order to spin at a similar rate as the recording media 520 in data storage devices 500 that operate in standard air conditions. The use of helium generally also reduces the operating temperature of the data storage device 500, as well as the amount of noise it generates. Smear is common in data storage devices that are sealed and contain helium.

For some overcoat materials (e.g., $CN_x$), smear can have a consistency and stickiness similar to that of peanut butter. As a result, a relatively large amount smear can accumulate before dropping off of the slider 525 onto the recording medium 520. While the smear is on the slider 525, it can cause the NFT reliability and/or fly height issues described above. Accordingly, it is desirable to mitigate the accumulation of smear on the slider 525.

Disclosed herein are slider 525 designs that discourage the accumulation of smear by reducing the size of, or eliminating altogether, certain surfaces of the slider 525 that might otherwise promote smear accumulation. In some embodiments, there is no horizontal surface between the rear surface of the slider's trailing pad and the trailing-edge surface of the slider 525 itself. In other words, in some embodiments, the trailing pad's rear surface is coincident with the trailing-edge surface of the slider 525. In other embodiments, there is a horizontal surface situated between the base of the trailing pad rear surface and the trailing-edge surface of the slider 525, and the depth of this horizontal surface relative to the ABS of the trailing pad and its width in the down-track direction are selected to mitigate smear accumulation on the slider 525 (e.g., on the trailing pad rear surface and/or on the rear surface of the trailing pad).

Figure 2A:
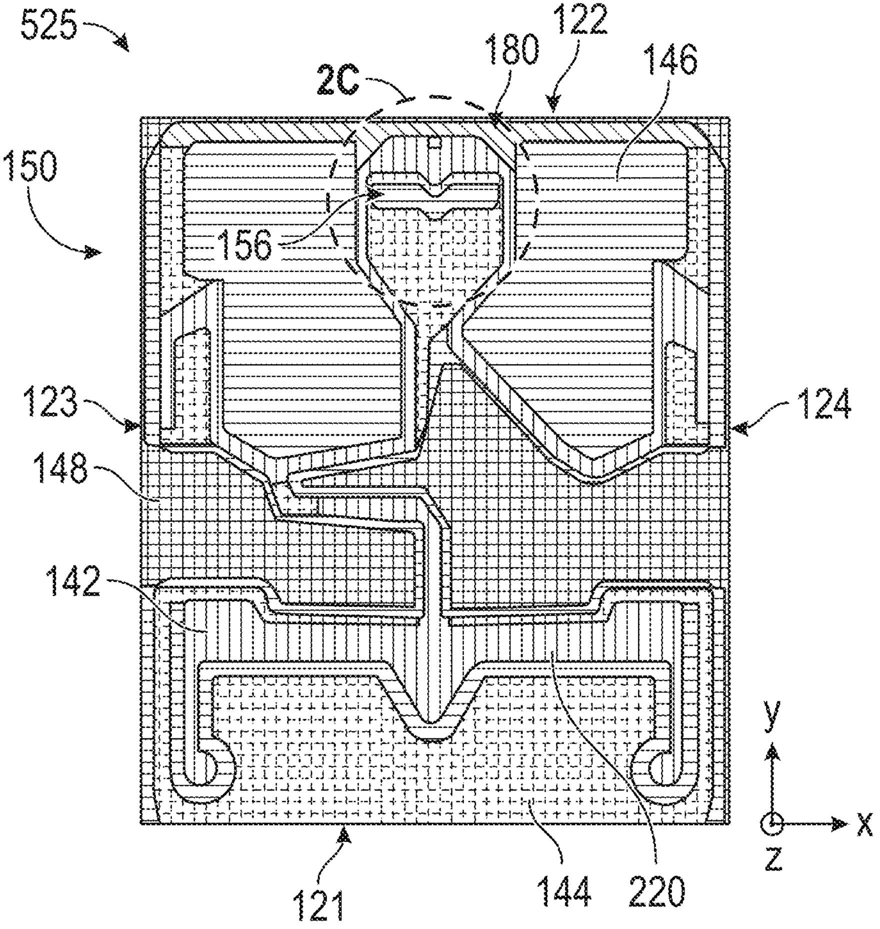
FIGS. 2A, 2B, 2C, and 2D illustrate an example of a slider in accordance with some embodiments.
Figure 2B:
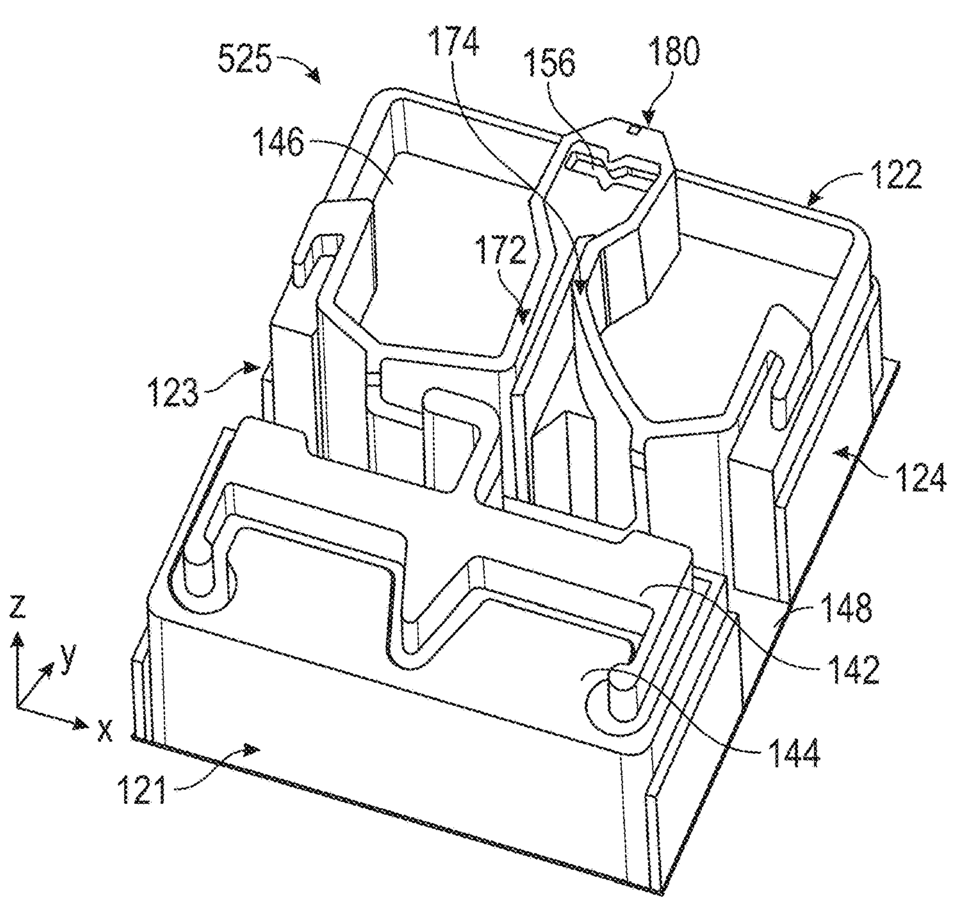
Figure 2C:
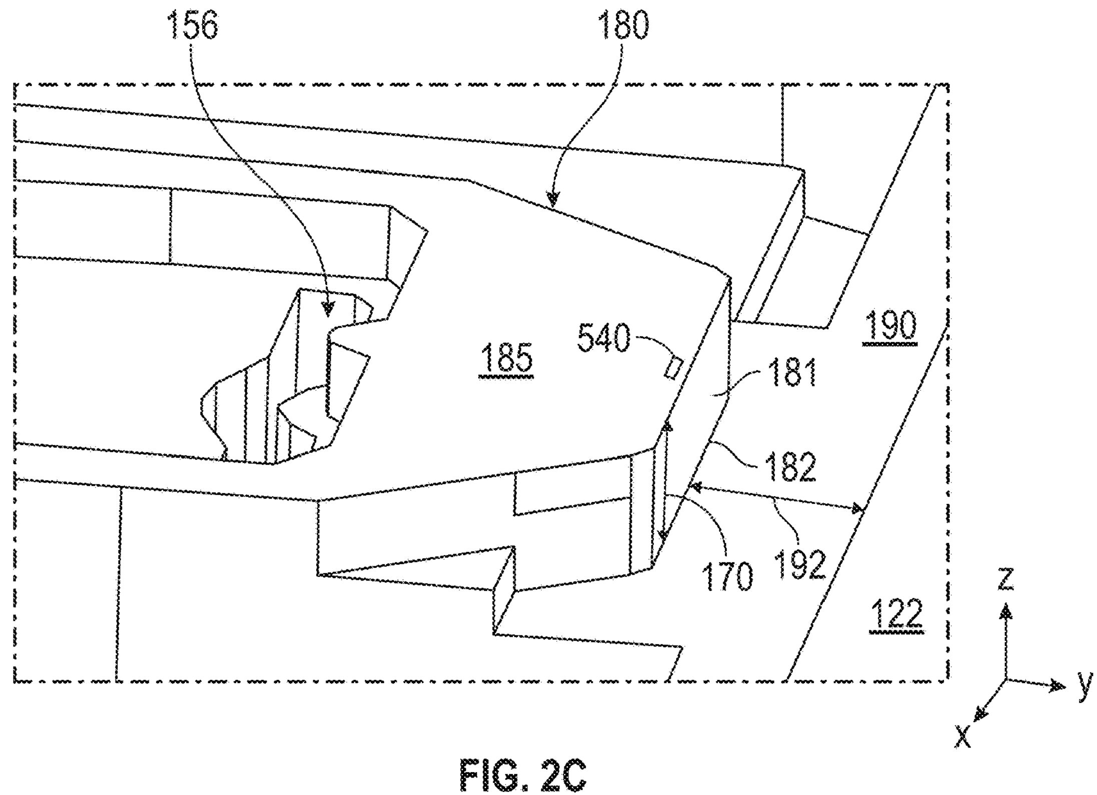
Figure 2D:
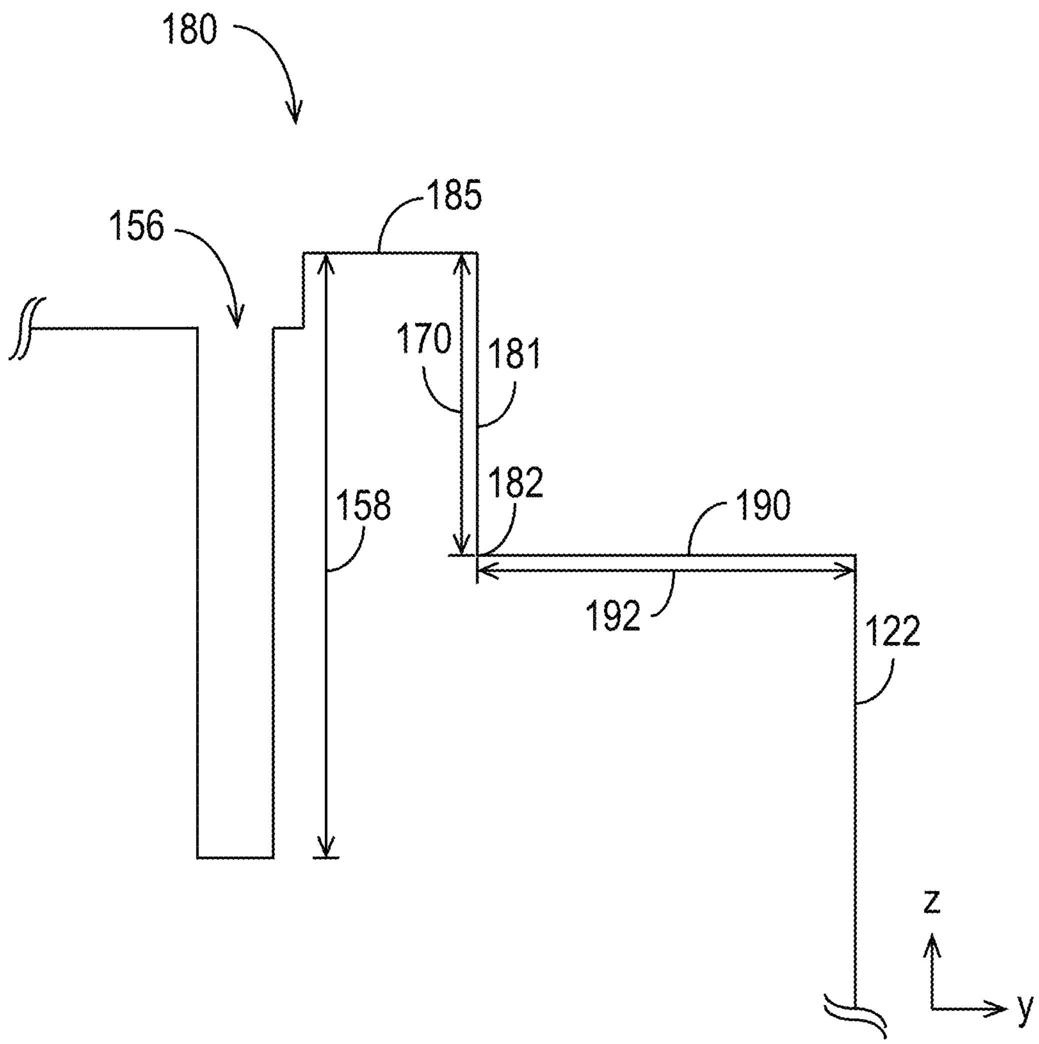

FIG. 2A is an ABS view of a slider 525 in accordance with some embodiments. Axes of a rectangular coordinate system are shown for reference. FIG. 2B is a perspective view of the slider 525 with the ABS oriented upward. FIG. 2C is a perspective view of a portion of slider 525 around the trailing pad 180, and FIG. 2D is a cross-section view of a portion of the trailing pad 180 region in a y-z plane (i.e., substantially perpendicular to the trailing-edge surface 122 and the leading-edge surface 121, and intersecting the EFH 156, described below).

The slider 525 has a leading-edge surface 121 that lies substantially in an x-z plane, a trailing-edge surface 122 opposite and substantially parallel to the leading-edge surface 121 (also substantially in an x-z plane), a first side-edge surface 123 extending between the leading-edge surface 121 and the trailing-edge surface 122, and a second side-edge surface 124 opposite the first side-edge surface 123 and extending between the leading-edge surface 121 and the trailing-edge surface 122. The first side-edge surface 123 and second side-edge surface 124 lie substantially in y-z planes and are substantially perpendicular to both the leading-edge surface 121 and the trailing-edge surface 122. The slider 525 includes a leading pad 220 near the leading-edge surface 121 and a trailing pad 180 near the trailing-edge surface 122 of the slider 525.

The topography 150 of the slider 525 includes surfaces at several levels in x-y planes. The top of the leading pad 220 and top of the trailing pad 180 are at the level 142. In this document, surfaces at the level 142 are referred to as the ABS of the slider 525. The level 142 is at a level that, when the slider 525 is facing upward, is the highest level of the topography 150. When the slider 525 is installed in a data storage device 500, the level 142 is the level of the topography 150 that is closest to the recording medium 520. (It is to be understood that when the recording medium 520 spins, certain surfaces at the level 142 (e.g., the ABS of the leading pad 220) may fly further from the recording medium 520 than other surfaces of the slider 525 at the same level 142 (e.g., the ABS of the trailing pad 180) due to the pitch angle of the slider 525 as it flies. Nevertheless, for purposes of the description herein, the level 142 (the ABS) is said to be closest to the recording medium 520 when the slider 525 is situated in a data storage device 500.)

The topography 150 also includes various surfaces at a level 144. The level 144 is recessed from the level 142. The recess distance may be, for example, between about 100 nanometers (nm) and about 300 nm. For example, the distance by which the level 144 is recessed from the level 142 may be approximately 150 nm. In other words, the height difference between the level 142 and the level 144 may be about 150 nm.

The topography 150 also includes various surfaces at a level 146. The level 146 is recessed from the level 142 and the level 144. The level 146 may be, for example, approximately 250 nm to 4000 nm below the level 142. When the slider 525 is installed in a data storage device 500, the level 146 is further from the recording medium 520 than are the level 142 and the level 144.

The topography 150 also includes various surfaces at a level 148. The level 148 is recessed from the level 142, the level 144, and the level 146. The level 148 may be, for example, approximately 300 to 3000 nm (0.3-3 microns) below the level 142. When the slider 525 is installed in a data storage device 500, the level 148 is further from the recording medium 520 than are the level 142, the level 144, and the level 146.

It is to be understood that when the slider 525 is installed in a data storage device 500, the topography 150 (and the surfaces at the level 142, referred to herein as the ABS) will be oriented downward, facing the recording medium 520. For ease of explanation, this document adopts the convention of illustrating and describing the slider 525 with the topography 150 facing upward, as shown in FIGS. 2B, 2C, and 2D. With the slider 525 so oriented, the level 142 (the ABS) is illustrated and sometimes described as being "above" the levels 144, 146, and 148; the level 144 is illustrated and sometimes described as being "below" the level 142 and "above" the levels 146 and 148; the level 146 is illustrated and described as being "below" the levels 142 and 144 and "above" the level 148; and the level 148 is illustrated and described as being "below" the levels 142, 144, and 146. Of course, when the slider 525 is installed in a data storage device 500, the topography 150 will be oriented downward, toward the recording medium 520. Consequently, the level 142 will be the level closest to the recording medium 520, making it the lowest level, and levels 144, 146, and 148 will be progressively further away from the recording medium 520.

As shown, in addition to the features already described, the slider 525 may also include first and second arms 172, 174 that connect to and extend from the trailing pad 180 toward the leading-edge surface 121. The first and second arms 172, 174 may be separated by an etched cavity and have tapered or stepped leading edges. In some embodiments, the first and second arms 172, 174 form a channel through which air flows when the slider 525 flies over the recording medium 520. Additional stepped surfaces may also be formed at various other locations on the slider 525, as illustrated in some or all of FIGS. 2A, 2B, 2C, and 2D.

Details of the trailing pad 180 region of the slider 525 are illustrated in FIGS. 2C and 2D. The trailing pad 180 is situated near the trailing-edge surface 122 of the slider 525. The trailing pad 180 has an ABS 185 with a recording head 540 mounted on the ABS 185. The recording head 540 may comprise, for example, a HAMR transducer. The recording head 540 may comprise, for example, any transducer (e.g., HAMR) that uses heat to write bits to a recording medium. The ABS 185 is the surface of the trailing pad 180 that, when the slider 525 is situated in a data storage device 500, is closest to the recording medium 520. In the illustrated example, the recording head 540 is situated on the ABS 185 near the trailing pad rear surface 181 of the trailing pad 180. In the illustrated example, the trailing pad rear surface 181 lies substantially in an x-z plane. Therefore, the trailing pad rear surface 181 is substantially perpendicular to the ABS 185 and substantially parallel to the trailing-edge surface 122.

The trailing pad 180 of the slider 525 shown in FIGS. 2A-2D also includes an efficiency-flattening hole (EFH) 156, which is an optional feature of the slider 525. As the slider 525 flies over the disk, the EFH 156 can store air (or, more generally, gas) and re-direct it over the recording head 540 in a substantially uniform way that is largely independent of the location of the slider 525 over the recording medium 520 (i.e., the airflow is approximately consistent regardless of the skew angle of the slider 525 as it flies). Thus, the EFH 156 is an example of a structure that can direct gas toward the recording head 540 as the slider 525 flies over the recording medium 520. Efficiency-flattening holes are described in more detail in, for example, U.S. Pat. No. 9,691,422, which is hereby incorporated by reference in its entirety for all purposes.

With specific reference to FIGS. 2C and 2D, the slider 525 includes a trailing horizontal surface 190 (i.e., substantially in an x-y plane) that is situated between the base 182 of the trailing pad rear surface 181 and the trailing-edge surface 122 of the slider 525. The base 182 of the trailing pad rear surface 181 (the interface between the trailing pad rear surface 181 and the trailing horizontal surface 190) and the trailing-edge surface 122 of the slider 525 are separated by a down-track distance 192. The down-track distance 192 is the width of the trailing horizontal surface 190 in the down-track direction (i.e., in the y-direction, using the illustrated rectangular coordinate system). The down-track distance 192 can be expressed in any convenient manner. As an example, the down-track distance 192 can be expressed as a value (e.g., less than or equal to some number of microns) or a percentage (e.g., less than or equal to some percentage of the length of the slider 525 (in the y-direction)).

The trailing horizontal surface 190 is recessed in the z-direction from the ABS 185 by a vertical distance 170. The vertical distance 170 can be any suitable value. In some embodiments, the vertical distance 170 is less than or equal to about 500 nanometers (nm).

As shown in FIG. 2D, relative to the ABS 185 of the trailing pad 180, the EFH 156 has a depth 158 in the z-direction, which can be any suitable value. For example, the depth 158 can be greater than or substantially equal to the vertical distance 170. In some embodiments, the depth 158 is between approximately 400 nm and approximately 4000 nm. In embodiments that include an EFH 156, the EFH 156 can be created during the same manufacturing step as the trailing horizontal surface 190, or it can be created at another time (e.g., the step or steps used to create surfaces shallower or deeper than the vertical distance 170).

Figure 3A:
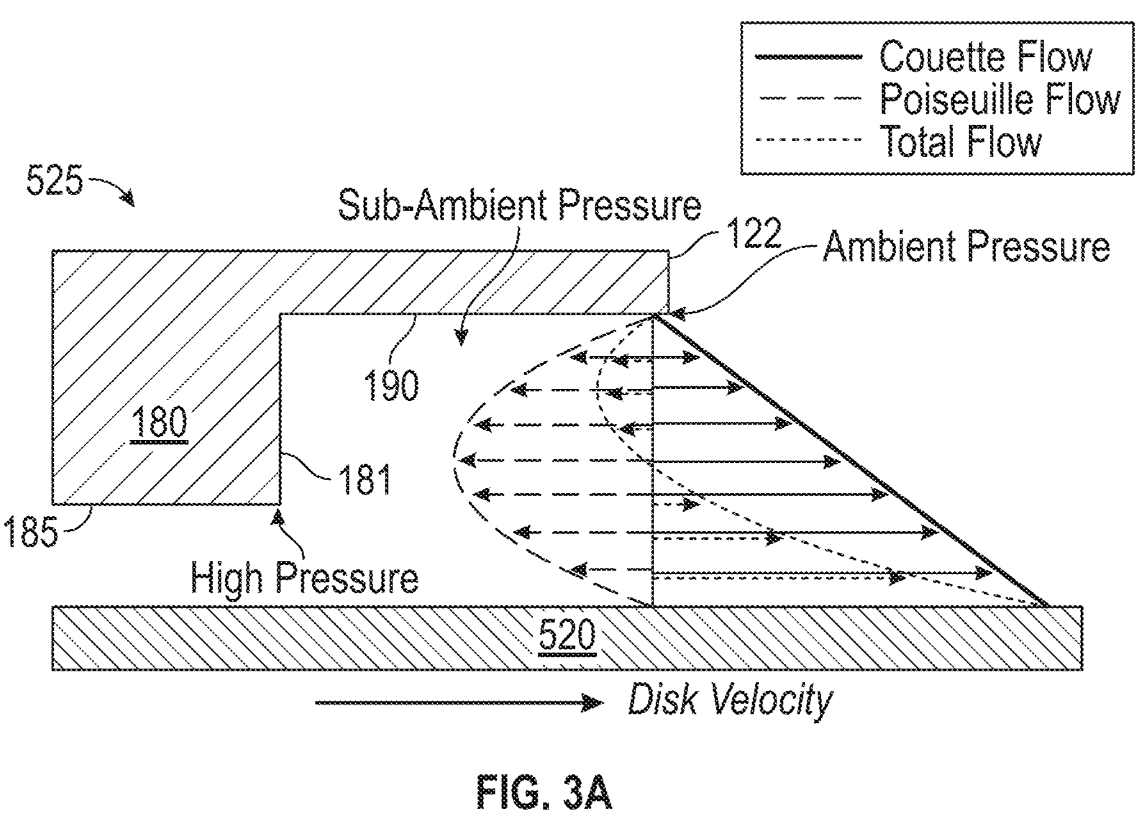
FIGS. 3A and 3B illustrate the airflow dynamics that can result in the accumulation of smear on and between the trailing pad rear surface and the trailing horizontal surface of a slider.
Figure 3B:
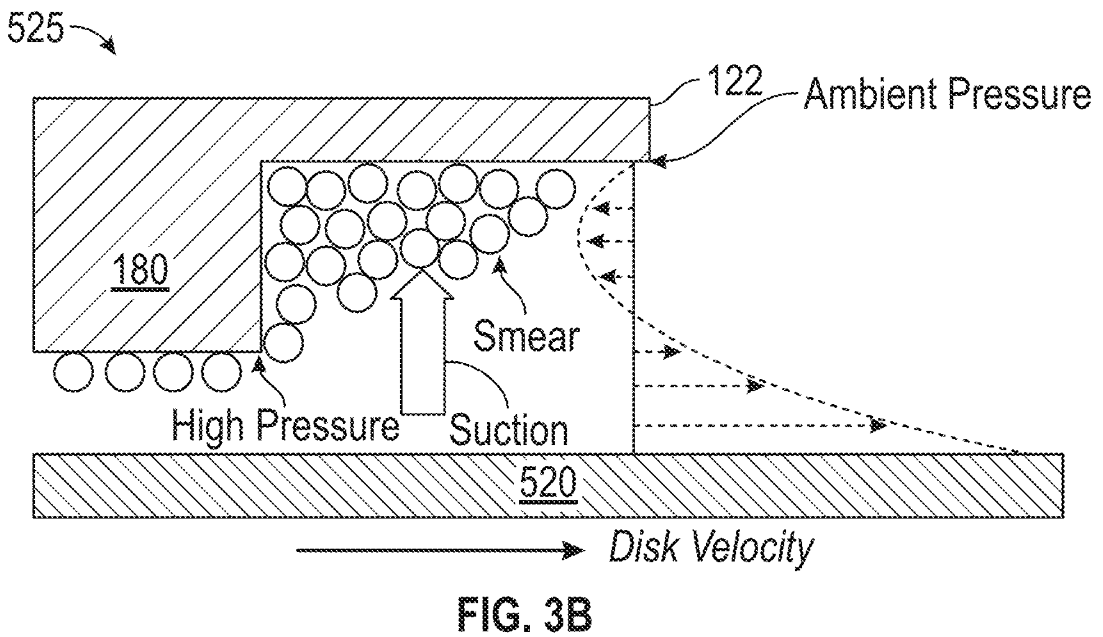

The inventors herein had the insight that as the slider 525 flies over the recording medium 520, smear tends to collect on and between the trailing pad rear surface 181 and the trailing horizontal surface 190 due to suction. FIGS. 3A and 3B illustrate the airflow dynamics that can result in the accumulation of smear on and between the trailing pad rear surface 181 and the trailing horizontal surface 190. The top of the trailing pad rear surface 181 experiences high pressure relative to the top of the trailing-edge surface 122 near the trailing pad 180, which experiences substantially ambient pressure. As a result, the region between the trailing horizontal surface 190 and the recording medium 520 experiences sub-ambient pressure. FIG. 3A illustrates the flows that result in the creation of sub-ambient pressure in this region. The solid curve and associated arrows represent the Couette flow, which is in the same direction as the velocity of the recording medium 520. As will be appreciated by those having ordinary skill in the art, Couette flow refers to the laminar flow of a viscous fluid between two parallel surfaces (here, the laminar flow of the gas in the data storage device 500 between the trailing horizontal surface 190 and the recording medium 520 and between the ABS 185 and the recording medium 520), where at least one surface is moving tangentially to the fluid. The long-dash curve and associated arrows represent the Poiseuille flow, which opposes the Couette flow. As will be appreciated by those having ordinary skill in the art, Poiseuille flow describes the laminar, pressure-driven flow of a viscous fluid through a channel or pipe (here, the flow of the gas in the data storage device 500 in the cavity formed by the trailing pad rear surface 181, the trailing horizontal surface 190, and the recording medium 520). The short-dash curve is the resulting total flow, representing the superposition of the Couette flow and the Poiseuille flow. As shown in FIGS. 3A and 3B, in the region between the trailing pad rear surface 181 and the trailing horizontal surface 190, the total flow direction is into the cavity formed by the trailing pad rear surface 181 and the trailing horizontal surface 190. As shown in FIG. 3B, the result of the total flow is suction that results in smear accumulation in the cavity.

The inventors had the insight that the suction and smear accumulation can be reduced by reducing the size of the cavity between the trailing pad rear surface 181 and the trailing horizontal surface 190. Specifically, reducing the down-track distance 192, or eliminating the trailing horizontal surface 190 altogether, would reduce the size of the cavity, the suction resulting from the flow dynamics, and the area on the slider that would be available for smear accumulation.

Figure 4A:
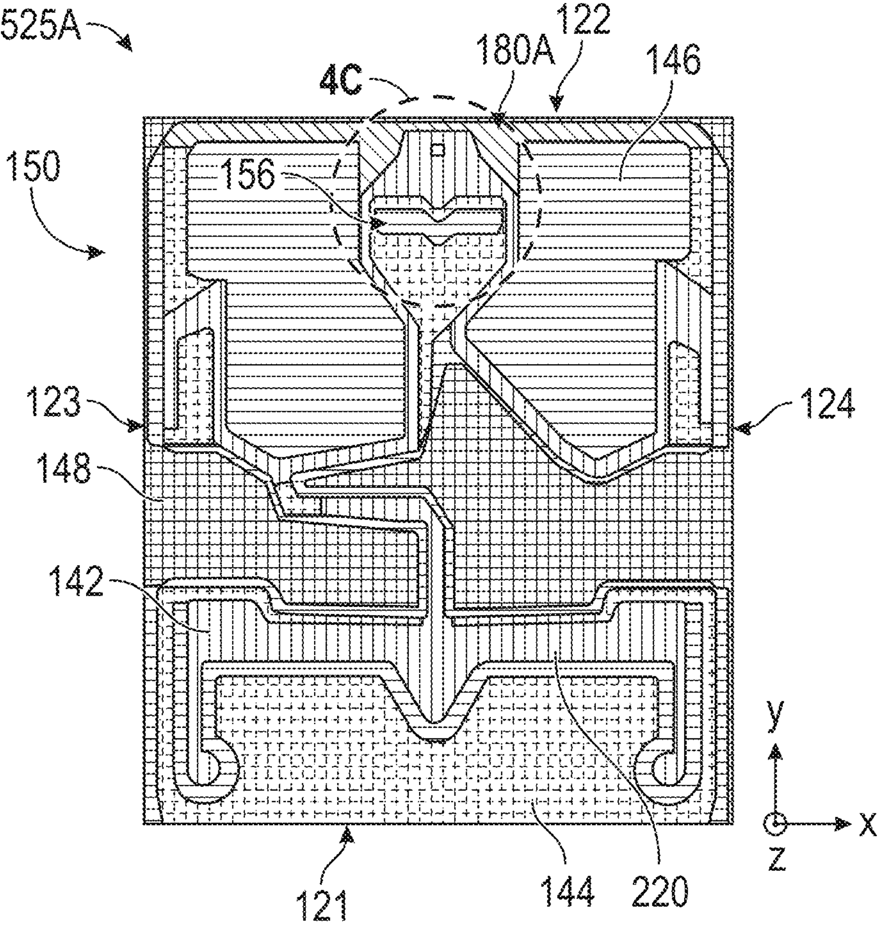
FIGS. 4A, 4B, 4C, and 4D illustrate an example of a slider in accordance with some embodiments.
Figure 4B:
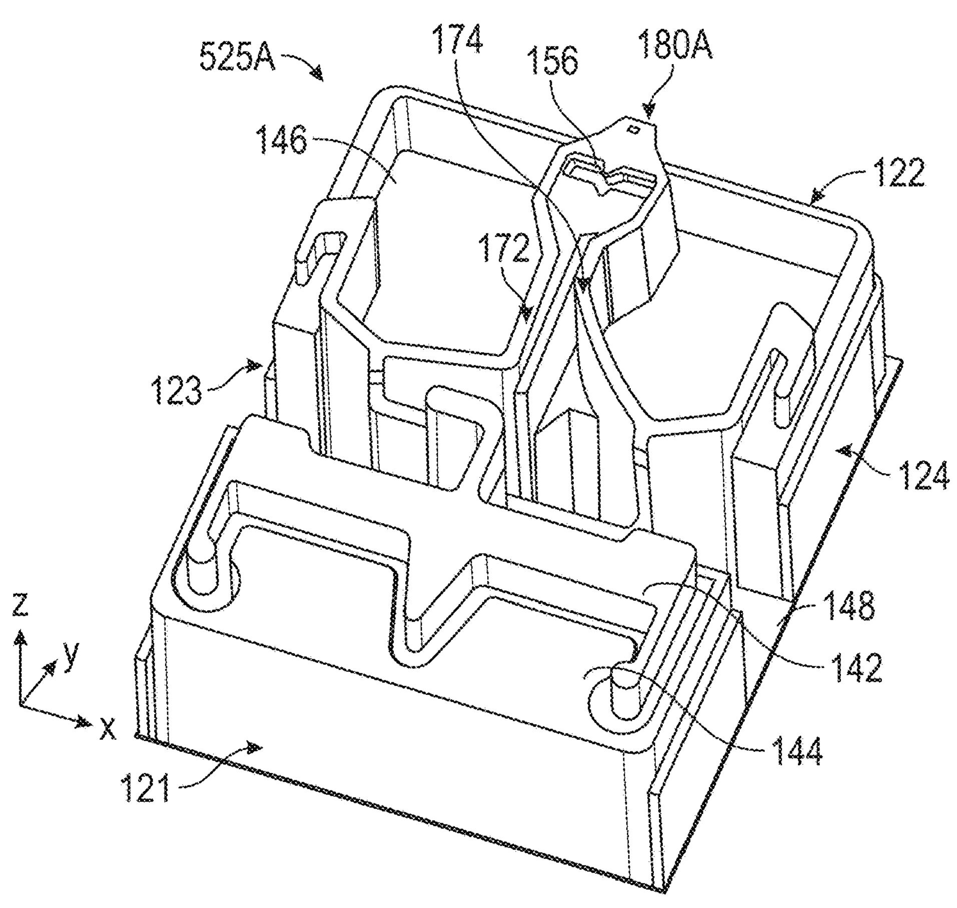
Figure 4C:
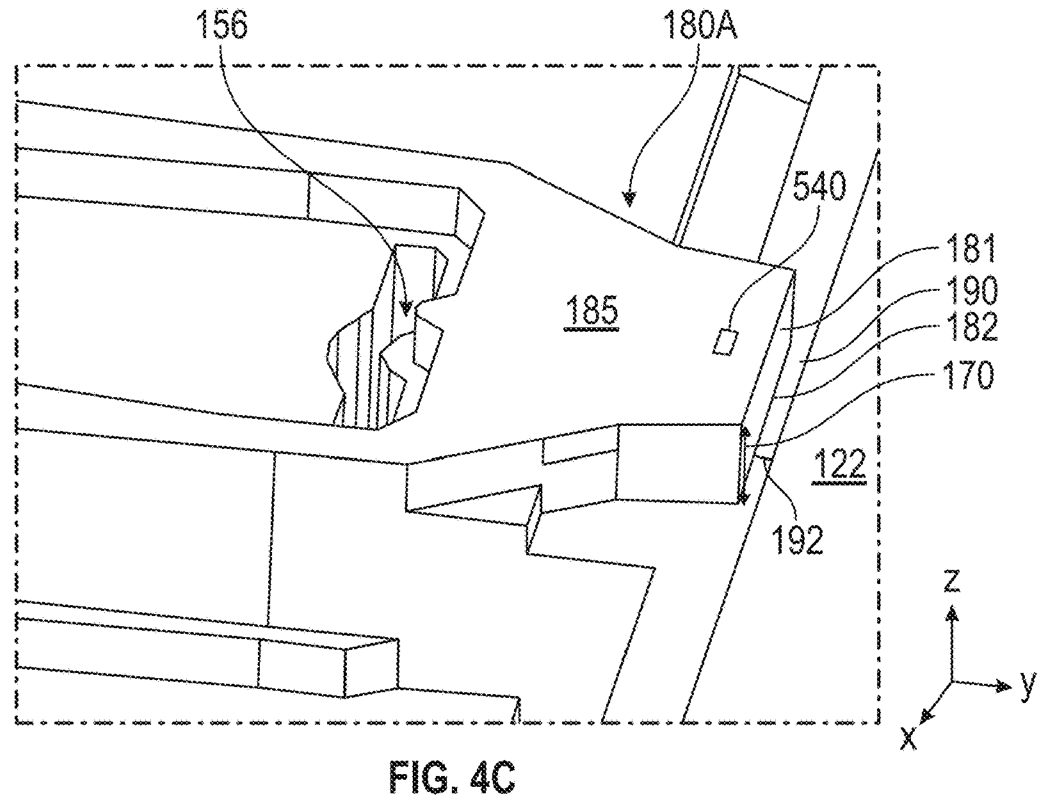
Figure 4D:
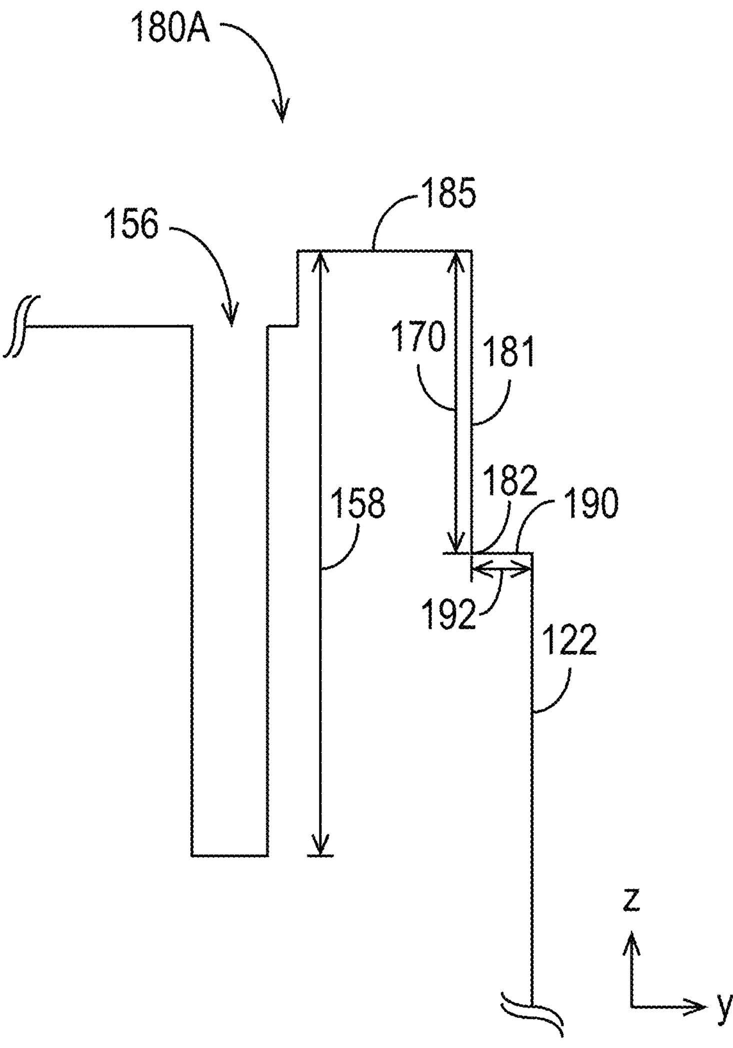

FIG. 4A is an ABS view of a slider 525A in accordance with some embodiments. Axes of the same rectangular coordinate system shown in FIG. 2A are shown for reference. FIG. 4B is a perspective view of the slider 525A with the ABS oriented upward. FIG. 4C is a perspective view of a portion of the slider 525A around the trailing pad 180A, and FIG. 4D is a cross-section view of a portion of the trailing pad 180A region in a y-z plane (i.e., substantially perpendicular to the trailing-edge surface 122 and the leading-edge surface 121, and intersecting the EFH 156).

The slider 525A has many of the same features as the slider 525, including a leading-edge surface 121, a trailing-edge surface 122, a first side-edge surface 123, a second side-edge surface 124, and a leading pad 220. Those features were described above in the context of FIGS. 2A-2D. Those descriptions also apply to the corresponding features of FIGS. 4A-4D and are not repeated here. Also, like the slider 525, the topography 150 of the slider 525A includes surfaces at several levels in x-y planes. The descriptions in the context of FIGS. 2A-2D are applicable to FIGS. 4A-4D and are not repeated here.

The slider 525A also includes a trailing pad 180A. Details of the trailing pad 180A of the slider 525A are illustrated in FIGS. 4C and 4D. As compared to the trailing pad 180, the trailing pad 180A extends closer to the trailing-edge surface 122 of the slider 525A. Thus, although the trailing pad rear surface 181 is still substantially perpendicular to the ABS 185 and substantially parallel to the trailing-edge surface 122, the down-track distance 192 (the width of the trailing horizontal surface 190 in the down-track (y-) direction) is less than it is in the slider 525.

Like the trailing pad 180, the trailing pad 180A has a recording head 540 mounted on it, and it also includes an EFH 156. The recording head 540 may comprise, for example, a HAMR transducer. The recording head 540 may comprise, for example, any transducer (e.g., HAMR) that uses heat to write bits to a recording medium. As for the slider 525, the EFH 156 is an optional feature of the slider 525A. The recording head 540 and EFH 156 were described above in the context of FIGS. 2A-2D. Those descriptions also apply to the recording head 540 and the EFH 156 of FIGS. 4A-4D and are not repeated here. The position of the recording head 540 relative to other features of the slider 525A (e.g., relative to the trailing-edge surface 122, the EFH 156, etc.) can be the same as in the slider 525, or the recording head 540 can move toward the trailing-edge surface 122 (as illustrated in FIGS. 4A, 4B, and 4C).

With specific reference to FIGS. 4C and 4D, like the slider 525, the slider 525A includes a trailing horizontal surface 190 that is situated between the base 182 of the trailing pad rear surface 181 and the trailing-edge surface 122 of the slider 525. Relative to the down-track distance 192 of the trailing horizontal surface 190 of the slider 525, the down-track distance 192 (the depth of the trailing horizontal surface 190 in the down-track (y-axis) direction) of the slider 525A is shorter to reduce suction and smear accumulation. In some embodiments, the down-track distance 192 is selected based on a likelihood of smear accumulation. For example, simulation or experiments can be performed to assess how likely the slider 525A is to accumulate smear. The down-track distance 192 can then be chosen based at least in part on the likelihood of smear accumulation. Additional considerations can be accounted for as well, such as, for example, manufacturing capabilities or limitations, slider flying characteristics, etc.

In some embodiments, the down-track distance 192 of the trailing horizontal surface 190 of the slider 525A is greater than zero and less than or equal to about 12 microns. In some embodiments, the down-track distance 192 of the trailing horizontal surface 190 of the slider 525 is less than or equal to about 1% of the overall length of the slider 525 (in the y-direction). Constraining the down-track distance 192 to a smaller number (or percentage) than in the slider 525 reduces the sub-ambient pressure in the cavity formed by the trailing pad rear surface 181 and the trailing horizontal surface 190, and reduces smear accumulation between/on the trailing pad rear surface 181 and the trailing horizontal surface 190.

As in the slider 525, the trailing horizontal surface 190 of the slider 525A is recessed in the z-direction from the ABS 185 by a vertical distance 170. The vertical distance 170 can be any suitable value. In some embodiments, the vertical distance 170 is less than or equal to about 500 nanometers (nm). The vertical distance 170 and/or the down-track distance 192 can be selected to mitigate smear accumulation on the trailing pad rear surface 181 and/or on the trailing horizontal surface 190.

It may be convenient to specify a smear accumulation path length for the slider 525A. The smear accumulation path length can be defined as the sum of the vertical distance 170 and the down-track distance 192. In some embodiments, the vertical distance 170 and the down-track distance 192 can be selected such that the smear accumulation path length is less than about 12 microns.

As in the slider 525, relative to the ABS 185 of the trailing pad 180A, the EFH 156 has a depth 158 in the z-direction, which can be any suitable value. For example, the depth 158 can be greater than or substantially equal to the vertical distance 170. In some embodiments, the depth 158 is between approximately 400 nm and approximately 4000 nm. In embodiments that include an EFH 156, the EFH 156 can be created during the same manufacturing step as the trailing horizontal surface 190, or it can be created at another time (e.g., the step or steps used to create surfaces shallower or deeper than the vertical distance 170).

Figure 5A:
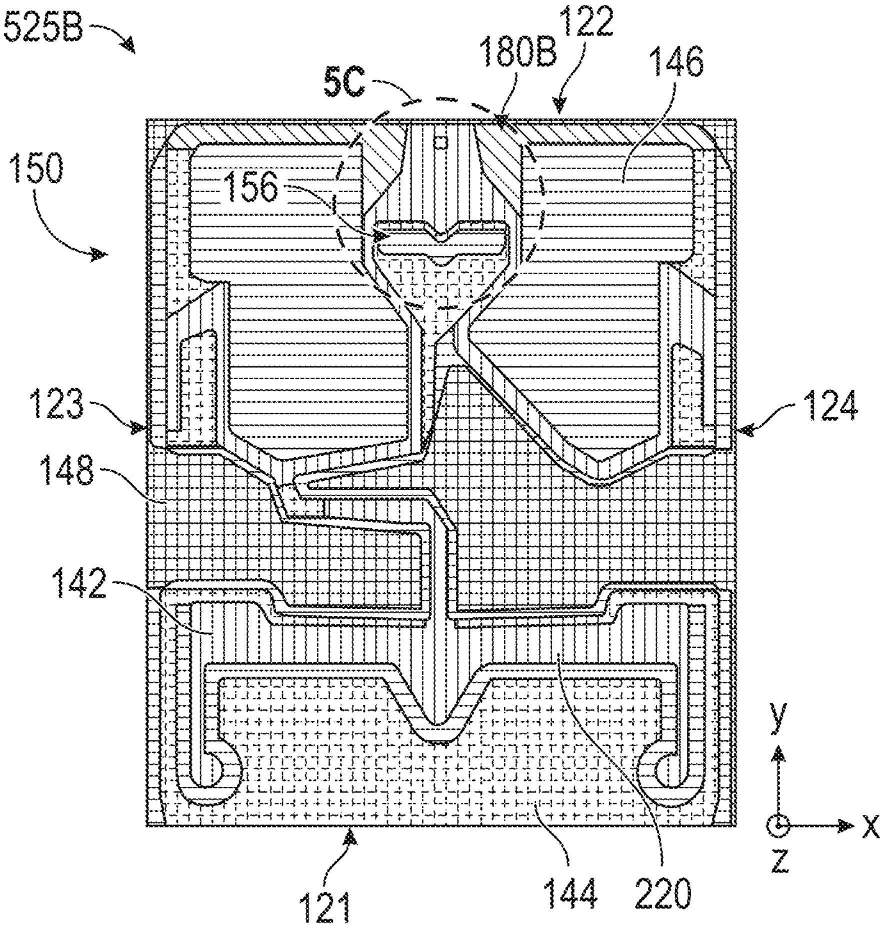
FIGS. 5A, 5B, 5C, and 5D illustrate an example of a slider in accordance with some embodiments.
Figure 5B:
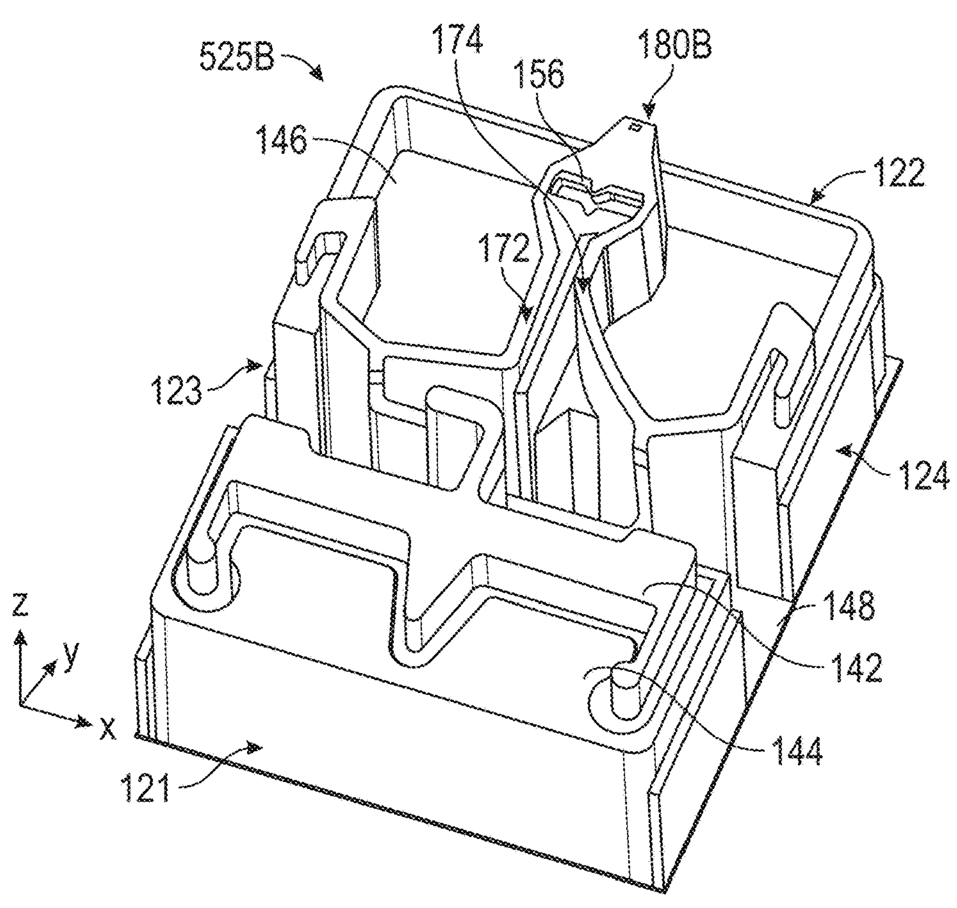
Figure 5C:
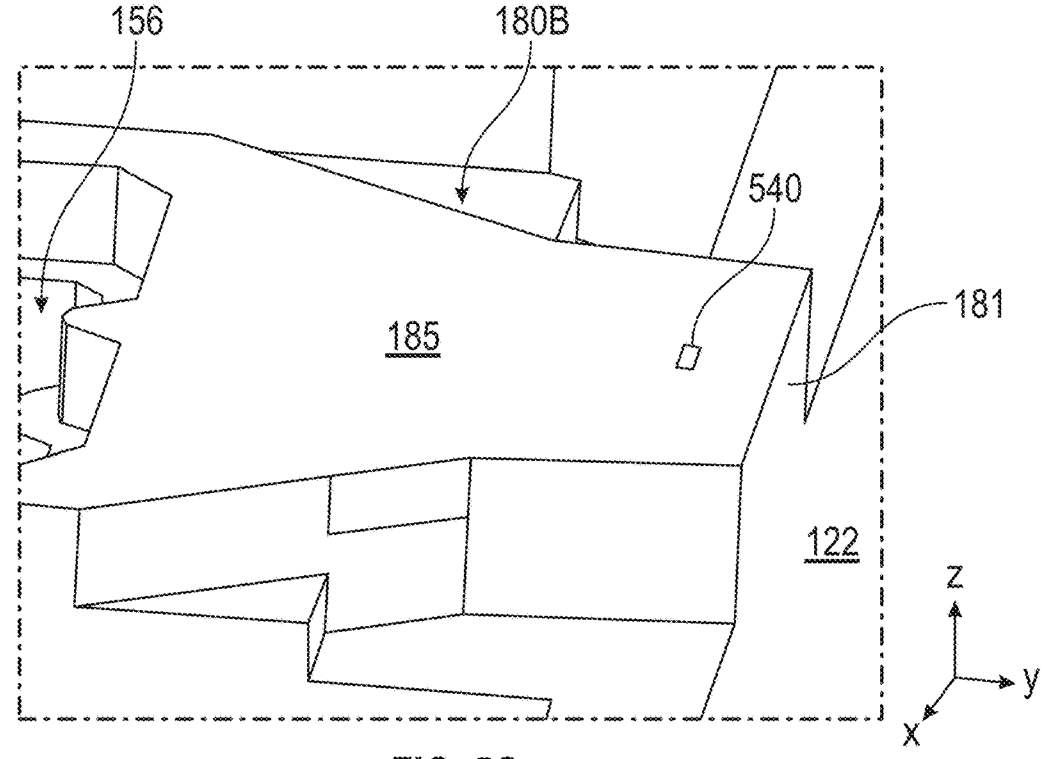
Figure 5D:
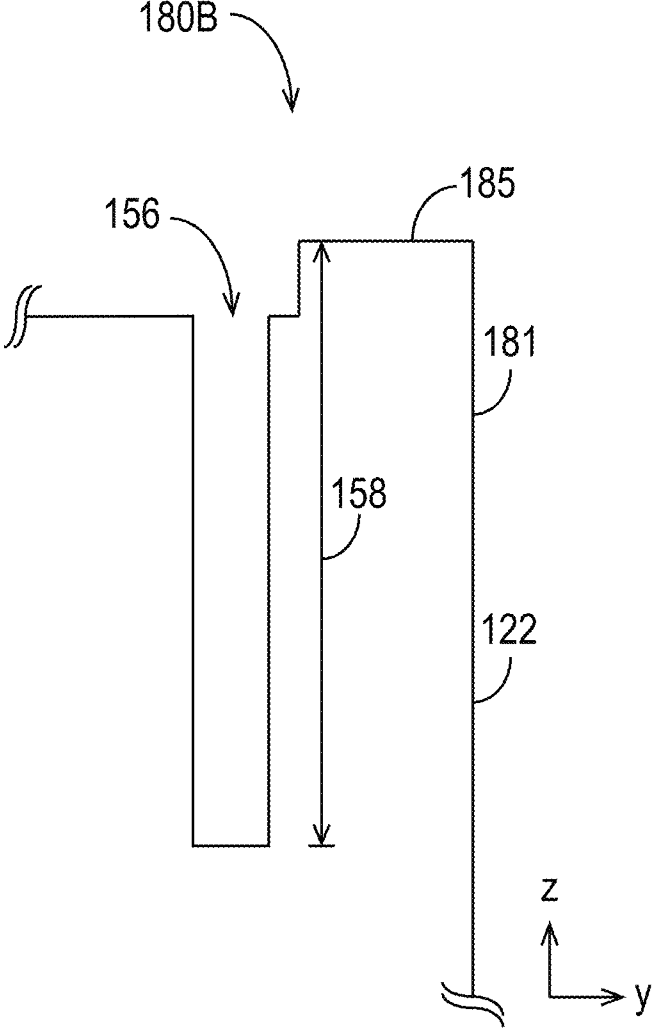

In some embodiments, the trailing horizontal surface 190 is eliminated altogether. FIG. 5A is an ABS view of a slider 525B in accordance with some embodiments. FIG. 5B is a perspective view of the slider 525B with the ABS oriented upward. FIG. 5C is a perspective view of a portion of the slider 525B around the trailing pad 180B, and FIG. 5D is a cross-section view of a portion of the trailing pad 180B region in a y-z plane (i.e., substantially perpendicular to the trailing-edge surface 122 and the leading-edge surface 121, and intersecting the EFH 156).

The slider 525B has many of the same features as the slider 525 and the slider 525A, including a leading-edge surface 121, a trailing-edge surface 122, a first side-edge surface 123, a second side-edge surface 124, and a leading pad 220. Those features were described above in the context of FIGS. 2A-2D. Those descriptions also apply to the corresponding features of FIGS. 5A-5D and are not repeated here. Also, like the slider 525 and the slider 525A, the topography 150 of the slider 525B includes surfaces at several levels in x-y planes. The descriptions in the context of FIGS. 2A-2D are applicable to FIGS. 5A-5D and are not repeated here.

The slider 525B also includes a trailing pad 180B. Details of the trailing pad 180B of the slider 525B are illustrated in FIGS. 5C and 5D. As compared to the trailing pad 180 and the trailing pad 180A, the trailing pad 180B extends all the way to the trailing-edge surface 122 of the slider 525B. As a result, the trailing pad rear surface 181 is coincident with the trailing-edge surface 122, and there is no trailing horizontal surface 190.

Like the trailing pad 180 and the trailing pad 180A, the trailing pad 180B has a recording head 540 mounted on it, and it also includes an EFH 156, which is an optional feature of the slider 525B. The recording head 540 may comprise, for example, a HAMR transducer. The recording head 540 may comprise, for example, any transducer (e.g., HAMR) that uses heat to write bits to a recording medium. The recording head 540 and EFH 156 were described above in the context of FIGS. 2A-2D. Those descriptions also apply to the recording head 540 and the EFH 156 of FIGS. 5A-5D and are not repeated here. The position of the recording head 540 relative to other features of the slider 525B (e.g., relative to the trailing-edge surface 122, the EFH 156, etc.) can be the same as in the slider 525, or the recording head 540 can move toward the trailing-edge surface 122 (as illustrated in FIGS. 5A, 5B, and 5C).

As in the slider 525, relative to the ABS 185 of the trailing pad 180B, the EFH 156 has a depth 158 in the z-direction, which can be any suitable value. In some embodiments, the depth 158 is between approximately 400 nm and approximately 4000 nm.

Figures 6A, 6B:
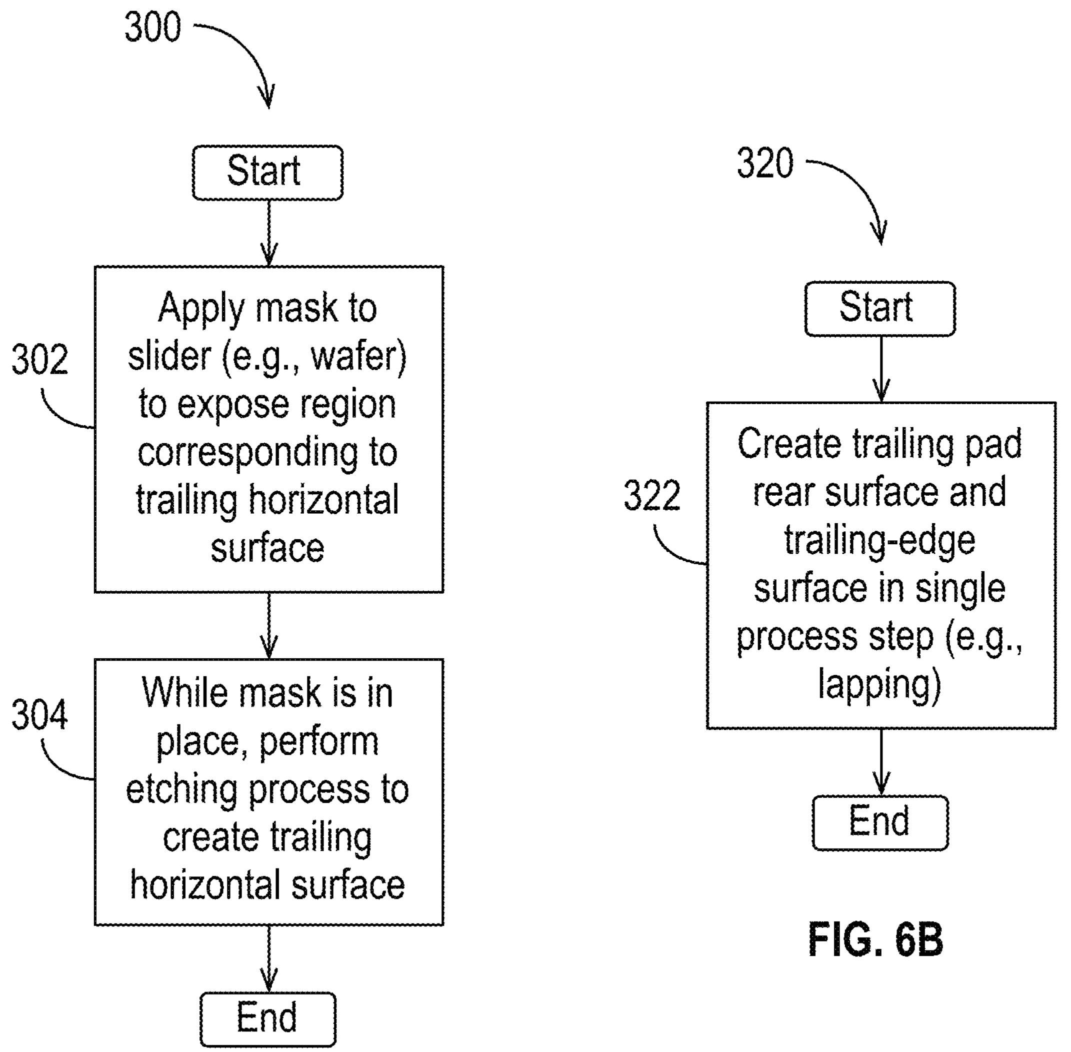
FIG. 6A is a flow diagram of steps in a process of making a slider with a trailing horizontal surface in accordance with some embodiments.
FIG. 6B is a flow diagram of steps in a process of making a slider in which there the trailing pad rear surface is coincident with the trailing-edge surface in accordance with some embodiments.

FIG. 6A is a flow diagram of steps in a method 300 of making a slider 525A (with a trailing horizontal surface 190) in accordance with some embodiments. At block 302, a mask is applied to the slider 525A (which may be in wafer form while being fabricated). The mask exposes a first region corresponding to the trailing horizontal surface 190. At block 304, while the mask is in place, an etching process is used to create the trailing horizontal surface 190. The etching process can remove material so that the trailing horizontal surface 190 is at a vertical distance 170 from the ABS 185, as described above. The etching process can also remove material so that the down-track distance 192 is the intended value.

FIG. 6B is a flow diagram of steps in a method 320 of making a slider 525B (in which there is no trailing horizontal surface 190, and the trailing pad rear surface 181 is coincident with the trailing-edge surface 122) in accordance with some embodiments. At block 322, the trailing pad rear surface 181 and the trailing-edge surface 122 are created in a single process step. In some embodiments, the single process step comprises lapping.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms “a,” “an” and “the” do not exclude plural referents unless otherwise specified. The word “or” is to be interpreted as inclusive unless otherwise specified. Thus, the phrase “A or B” is to be interpreted as meaning all of the following: “both A and B,” “A but not B,” and “B but not A.” Any use of “and/or” herein does not mean that the word “or” alone connotes exclusivity.

As used in the specification and the appended claims, phrases of the form “at least one of A, B, and C,” “at least one of A, B, or C,” “one or more of A, B, or C,” and “one or more of A, B, and C” are interchangeable, and each encompasses all of the following meanings: “A only,” “B only,” “C only,” “A and B but not C,” “A and C but not B,” “B and C but not A,” and “all of A, B, and C.”

To the extent that the terms “include(s),” “having,” “has,” “with,” and variants thereof are used in the detailed description or the claims, such terms are intended to be inclusive in a manner similar to the term “comprising,” i.e., meaning “including but not limited to.”

The terms “exemplary” and “embodiment” are used to express examples, not preferences or requirements.

The term “coupled” is used herein to express a direct connection/attachment as well as a connection/attachment through one or more intervening elements or structures.

The terms “over,” “under,” “between,” and “on” are used herein refer to a relative position of one feature with respect to other features. For example, one feature disposed “over” or “under” another feature may be directly in contact with the other feature or may have intervening material. Moreover, one feature disposed “between” two features may be directly in contact with the two features or may have one or more intervening features or materials. In contrast, a first feature “on” a second feature is in contact with that second feature.

The term “substantially” is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as “substantially equal” means that the two lengths are the same for all practical purposes, but they may not (and need not) be precisely equal at sufficiently small scales. As another example, a structure that is “substantially vertical” would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A slider, comprising:

a trailing-edge surface;

a trailing pad comprising an air-bearing surface (ABS) and a trailing pad rear surface, wherein the trailing pad rear surface is substantially perpendicular to the ABS and substantially parallel to the trailing-edge surface, and wherein the trailing pad rear surface is recessed from the trailing-edge surface by a down-track distance; and a trailing horizontal surface extending from a base of the trailing pad rear surface to the trailing-edge surface, wherein a width of the trailing horizontal surface in a down-track direction is the down-track distance, wherein:

the down-track distance is greater than zero and less than or equal to about 12 microns.

2. The slider recited in claim 1, further comprising a recording head situated on the ABS of the trailing pad.

3. The slider recited in claim 2, wherein the recording head comprises a heat-assisted magnetic recording (HAMR) transducer.

4. The slider recited in claim 3, wherein the down-track distance is selected to mitigate accumulation of smear on at least one of the trailing pad rear surface or on the trailing horizontal surface.

5. The slider recited in claim 3, wherein a vertical distance between the ABS of the trailing pad and the trailing horizontal surface is greater than zero and less than or equal to about 500 nanometers.

6. The slider recited in claim 5, wherein:

a vertical distance between the ABS of the trailing pad and the trailing horizontal surface is greater than zero and less than or equal to about 500 nanometers, and/or at least one of the down-track distance or the vertical distance is selected to mitigate accumulation of smear on at least one of the trailing pad rear surface or on the trailing horizontal surface, and/or a smear accumulation path length is less than about 12 microns.

7. The slider recited in claim 1, wherein a smear accumulation path length is less than about 12 microns.

8. The slider recited in claim 1, wherein the down-track distance is selected to mitigate accumulation of smear on at least one of the trailing pad rear surface or on the trailing horizontal surface.

9. The slider recited in claim 1, wherein a vertical distance between the ABS of the trailing pad and the trailing horizontal surface is greater than zero and less than or equal to about 500 nanometers, and wherein at least one of the down-track distance or the vertical distance is selected to mitigate accumulation of smear on at least one of the trailing pad rear surface or on the trailing horizontal surface.

10. The slider recited in claim 1, wherein the down-track distance is less than or equal to 1% of an overall length of the slider in the down-track direction.

11. The slider recited in claim 1, wherein the trailing pad further comprises an efficiency-flattening hole.

12. A method of designing the slider recited in claim 1, comprising:

selecting the down-track distance based at least in part on at least one of: (a) a likelihood of smear accumulation, or (b) a smear accumulation path length.

13. A method of making the slider recited in claim 1, comprising:

applying a mask to the slider, wherein the mask exposes a first region corresponding to the trailing horizontal surface; and while the mask is in place, performing an etching step to create the trailing horizontal surface.

14. A data storage device, comprising:

a recording medium; and the slider recited in claim 1.

15. A slider, comprising:

a trailing-edge surface; and a trailing pad comprising:

a heat-assisted magnetic recording (HAMR) head situated on an air-bearing surface (ABS) of the trailing pad, wherein the ABS of the trailing pad is substantially perpendicular to the trailing-edge surface, and a trailing pad rear surface, wherein the trailing pad rear surface is coincident with the trailing-edge surface.

16. The slider recited in claim 15, wherein the trailing pad further comprises an efficiency-flattening hole.

17. The slider recited in claim 16, wherein a depth of the efficiency-flattening hole relative to the ABS of the trailing pad is between approximately 400 nm and 4000 nm.

18. A method of making the slider recited in claim 15, comprising:

creating the trailing pad rear surface and the trailing-edge surface in a single process step.

19. The method of claim 18, wherein the single process step comprises lapping.

20. A data storage device, comprising:

a recording medium; and a slider comprising:

a trailing-edge surface; and a trailing pad comprising:

means for using heat to write bits to the recording medium, and a trailing pad rear surface, wherein the trailing pad rear surface is coincident with the trailing-edge surface.

21. The data storage device recited in claim 20, wherein the trailing pad further comprises:

means for directing gas toward the means for using heat to write bits to the recording medium.

22. The data storage device recited in claim 20, wherein the trailing pad further comprises:

means for reading the bits from the recording medium.

* * * * *